United States Patent
Hetterscheid et al.

(10) Patent No.: US 11,622,542 B2
(45) Date of Patent: Apr. 11, 2023

(54) POULTRY CONTAINER SIDE PANEL, POULTRY CONTAINER AND ASSEMBLY OF A POULTRY CONTAINER AND AT LEAST ONE SUCH SIDE PANEL

(71) Applicant: MAREL STORK POULTRY PROCESSING B.V., Boxmeer (NL)

(72) Inventors: Hendrikus Anthonius Theresia Petrus Hetterscheid, Boxmeer (NL); Marcus Marinus Gerardus Kroot, Sint Anthonis (NL); Roger Pierre Hubertus Maria Claessens, Malden (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 923 days.

(21) Appl. No.: 16/345,864

(22) PCT Filed: Nov. 2, 2017

(86) PCT No.: PCT/NL2017/050707
§ 371 (c)(1),
(2) Date: Apr. 29, 2019

(87) PCT Pub. No.: WO2018/084704
PCT Pub. Date: May 11, 2018

(65) Prior Publication Data
US 2020/0045938 A1 Feb. 13, 2020

(30) Foreign Application Priority Data
Nov. 2, 2016 (NL) ...................................... 2017707

(51) Int. Cl.
*A01K 31/00* (2006.01)
*B65D 6/08* (2006.01)
*B65D 85/50* (2006.01)

(52) U.S. Cl.
CPC .............. *A01K 31/002* (2013.01); *B65D 7/14* (2013.01); *B65D 85/50* (2013.01)

(58) Field of Classification Search
CPC .... A01K 1/0017; A01K 1/0236; A01K 1/032; A01K 1/033; A01K 1/034; A01K 1/035;
(Continued)

(56) References Cited

U.S. PATENT DOCUMENTS 150,185 A * 4/1874 Page ........................ E05C 19/06
192/81 C
218,047 A 7/1879 Millar
(Continued)

FOREIGN PATENT DOCUMENTS

CN 2334171 Y 8/1999
CN 201138979 Y 10/2008
(Continued)

OTHER PUBLICATIONS

International Search Report and Written Opinion from PCT Application No. PCT/NL2017/050707, dated Mar. 8, 2018.
(Continued)

*Primary Examiner* — Peter M Poon
*Assistant Examiner* — Morgan T Jordan
(74) *Attorney, Agent, or Firm* — Workman Nydegger

(57) ABSTRACT

A poultry container side panel for releasable connection to a container for holding live poultry. The poultry container has a rectangular screen with aperture, a sideward protruding foot, and at least one coupling. The coupling features a stationary support connected to the rectangular screen and a displaceable locking element moveable between a coupling position and a release position. The poultry container provides a side wall with a rectangular aperture for receiving a poultry container side panel as well as for the assembly of such poultry container side panel and such poultry container.

14 Claims, 4 Drawing Sheets

(58) Field of Classification Search
CPC ............ A01K 31/002; Y10T 292/0894; Y10T 292/0895; Y10T 292/0902; Y10T 292/63
USPC .............................. 49/449; 256/73; 403/349
See application file for complete search history.

(56) References Cited

U.S. PATENT DOCUMENTS

| | | | | |
|---|---|---|---|---|
| 421,350 | A * | 2/1890 | Cook | E05F 11/00 292/206 |
| 484,663 | A * | 10/1892 | Martin | E05C 19/06 292/87 |
| 713,233 | A * | 11/1902 | Mellinger | E05C 19/06 292/87 |
| 791,234 | A * | 5/1905 | Yoakum | B65D 9/14 217/47 |
| 957,069 | A * | 5/1910 | La Bauve | B65D 7/20 220/6 |
| 1,052,721 | A * | 2/1913 | Hatzfield | E06B 3/5063 49/129 |
| 1,191,294 | A * | 7/1916 | Frame | B61D 3/163 119/401 |
| 2,657,443 | A * | 11/1953 | Hartman | F16B 21/20 24/339 |
| 3,435,557 | A * | 4/1969 | Johnson | E06B 11/02 49/70 |
| 3,734,467 | A * | 5/1973 | Weeden | E04H 17/163 256/73 |
| 3,990,400 | A * | 11/1976 | Shreckhise | A01K 31/002 119/494 |
| 3,993,026 | A * | 11/1976 | Shreckhise | A01K 31/002 119/494 |
| 4,044,910 | A | 8/1977 | Box | |
| 4,762,085 | A * | 8/1988 | Ondrasik | A01K 31/08 119/474 |
| 5,261,260 | A * | 11/1993 | Lin | E05B 47/0002 292/144 |
| 5,638,973 | A | 6/1997 | Dewey et al. | |
| 6,073,790 | A | 6/2000 | Umiker | |
| 6,230,655 | B1 * | 5/2001 | Cohen | A01K 31/02 119/459 |
| 2004/0159659 | A1 | 8/2004 | Rumpel | |
| 2009/0288613 | A1 | 11/2009 | Ho | |
| 2010/0213337 | A1 * | 8/2010 | Fergin | F16B 2/246 248/327 |
| 2014/0261217 | A1 | 9/2014 | Purtle et al. | |

FOREIGN PATENT DOCUMENTS

| | | | | |
|---|---|---|---|---|
| CN | 202588034 Y | | 12/2012 | |
| CN | 111119573 A | * | 5/2020 | ............... E06C 7/44 |
| DE | 3129052 A1 | | 2/1983 | |
| EP | 0546925 A1 | | 6/1993 | |
| EP | 1025750 A2 | * | 8/2000 | ........... A01K 1/0017 |
| GB | 1262404 A | | 2/1972 | |
| GB | 2200164 A | * | 7/1988 | ........... A01K 1/0017 |
| GB | 2527500 A | * | 12/2015 | ............... A01K 1/00 |
| WO | WO-2010093241 A1 | * | 8/2010 | ............... E06C 7/44 |
| WO | WO-2010093242 A1 | * | 8/2010 | ............... E06C 7/44 |

OTHER PUBLICATIONS

Netherlands Search Report from NL Application No. 2017707, dated Jul. 13, 2017.
Korean Office Action in corresponding Korean Patent Application No. 10-2019-7012262, dated Aug. 27, 2022.

* cited by examiner

POULTRY CONTAINER SIDE PANEL, POULTRY CONTAINER AND ASSEMBLY OF A POULTRY CONTAINER AND AT LEAST ONE SUCH SIDE PANEL

BACKGROUND

The present invention relates to a poultry container side panel for releasable connection to a container for holding live poultry, a poultry container for holding live poultry, according the preamble of claim 1, a poultry container and an assembly of such poultry container and at least one of such poultry container side panels.

During storage and transport of poultry (for instance on a poultry farm, from a poultry farm to another poultry farm, on a transport vehicle, from a poultry farm to a slaughterhouse or on a slaughterhouse) the poultry is usually held or transported alive in poultry holders. One such poultry holder is normally designed to hold plural animals in the order of magnitude of a dozen or several dozen of animals. These poultry holders are also referred to as "pallets", "crates", "cages" or "containers". For easy logistics a plurality of such poultry holders may be combined in a shared support structure that makes it possible to stack the poultry holders compact and to displace a support structure with the several holders as a single unit. A support structure may consist of a steel frame in which a number of poultry holders are held in stacked (multilayer) manner and from which the poultry holders can be wholly or partially removed, and can thus for instance be embodied such that they can slide optionally fully into and out of the support structure, similarly to drawers in a chest of drawers. Another possibility is to integrate the poultry holders with the support structure so that this latter structure comprises compartments provided with individually controllable closing means.

As an alternative also plural individual poultry containers may be used that may be stacked onto each other to be combined to a poultry container assembly of a desired height. In practise use may be made of poultry containers assemblies with stacks of for instance four, five or six poultry container stacked onto each other. Each individual poultry container containing live poultry of a poultry container assembly is covered by the poultry container placed on top of that container except for the upper most poultry container of the poultry container assembly that has a poultry container cover.

The poultry holders, or poultry containers, are often reused, and undergo various processing steps. During these processing steps the poultry containers are often roughly handled which leads to various physical contact with the poultry containers. Furthermore the use of the poultry containers also may lead to a chemical load on the poultry containers (for instance due to the poultry droppings and/or cleaning products used).

The US patent application 2009/0288613 discloses a collapsible pet cage assembled from a plurality of interlocking panels including a front panel and a rear panel, two lateral panels, a bottom panel and a top panel. The rear panel of the collapsible pet cage has a door pivotably attached to a frame.

SUMMARY

It is an object of the present invention to provide a poultry container that is robust and hygienic but also cheap and easy to repair in case of damage and/or wear. A further object of the present invention is to provide a poultry container that is easy to personalise or to adapt to specific conditions with only limited costs.

The invention provides for this purpose a poultry container side panel for releasable connection to a poultry container for holding live poultry, according claim 1. A releasable poultry container side panel enables to exchange side panels in case of damage to a side panel. The sides panels of poultry containers are sensitive to wear and damage as they have a relative large surface area. For instance the forks of a fork lift handling poultry containers may damage a side panel when a handling operation is less accurate. Furthermore the panels may relatively simple and cheap, e.g. as a single moulded part, be made out of a lighter material than the basic structure (like a frame) of the poultry container as the side panels have to provide less constructive strength to the poultry container. The panels may for instance in a single production step be injection moulded form a single synthetic material, including the displaceable locking element. However the present invention also enables a synthetic displaceable locking element to be included as an in-mould attachment. This last technique (in mould attachment of the locking element) could be utilised if the synthetic material of the locking element is preferred to be of another synthetic material than the synthetic material of the rectangular screen. The poultry container side panels may thus be of lighter construction than the basic construction of the poultry container, however this makes the side panels including a synthetic and integrated displaceable locking element a vulnerable part of the poultry container. A further advantage of releasable poultry container side panels according the present invention is that the panels may easily be "personalised". For instance the colour and or print on the panels may be varied. It is also possible to adapt to panels to specific conditions of use, for instance poultry side panels with less ventilation openings in colder conditions (colder locations and/or colder season) and more openings in warmer conditions (warmer locations and/or warmer season). It is also possible to choose for heavier poultry container side panels in extreme conditions, as well as the other way around. The option to make the whole poultry container side panel from a single synthetic material (including the displaceable locking element) is that stress due to differences in the thermal extension or shrinkage of panel parts will not occur. Also the container side panel according the present invention will be easy to clean (hygienic).

To provide a resilient connection of the displaceable locking element to the rectangular screen use may be made of the flexibility of the connecting synthetic material. In the situation of the use of only a single synthetic material the thickness of the material this flexibility may be realised by a construction where in between the displaceable locking element and the rectangular screen the material is preferably thinner than the material of the displaceable locking element and the rectangular screen.

The synthetic displaceable locking element has, in a specific embodiment, a central opening and a control flap that projects from the poultry container side panel. The central opening may be useful for acceptance of an external protruding locking element like a pen and—at least a part of—the control flap projecting from the substantially rectangular screen enables easy access to the control flap and thus simplifies the locking and unlocking operation for an operator.

These advantages are realized according to the invention with a releasable poultry container side panel having a substantially rectangular screen provided with apertures to provide aeration of the internal side of the poultry container. The elements for releasable coupling of the rectangular screen are simple of construction. The at least one positioning element located at one of the circumferential or peripheral sides of the substantially rectangular screen may be a simple opening or protruding element in/at one of the peripheral sides of the rectangular screen. And also the coupling of the rectangular screen is easy to produce but also very simple to be used without the chance of uncontrolled release of the screen from a poultry containers when coupled. The construction may be such that it enables a unique positioning of the releasable poultry container side panel, making it impossible to connect a poultry container side panel incorrect with the poultry container. Use of the releasable poultry container side panel may thus be "fool proof"; while only a simple displacement of the locking element is required for coupling and decoupling.

The displaceable locking element may enable a rest situation while in a coupling position. The "rest situation" is the situation wherein no external ("release") pressure is exerted on the displaceable locking element. To displace the locking element from the coupling position to a release position an external pressure may be exerted, for instance in a direction different from the direction as seen from the support to the locking element. The displaceable locking element may be displaceable in a direction substantially parallel to the rectangular screen. Such movability of the locking element provides additional security against undesired uncoupling of a poultry container side panel. And for a further simplification of the construction the displaceable locking element may be resiliently connected to the support. It is also an option to provide one or more resistant elements, like for instance ridges, bumps, chamfers and/or bevels in the path of movement of the displaceable locking element. For instance in locking or releasing the screen contact of the displaceable locking element with one or more of the resistant elements may indicate that an intended action is realised. As to assist an operator in simple and correct placement or removal of a poultry container side screen so a "feedback" is proved (e.g. a tactile barrier or a sensible feed-back) for instance for indicating that a complete unlocking of complete locking action is realised.

For a stable rest of the poultry container side panel onto the periphery of the aperture in the poultry container the poultry container side panel may comprise at least one sideward protruding foot from one of the peripheral sides of the substantially rectangular screen. An even more stable contact the poultry container side panel may also comprises plural of such feet (like for instance legs), located as desired only at a single one of the peripheral sides of the rectangular screen, or as an alternative, protruding from more than one of the peripheral sides of the rectangular screen. One or more protruding feet will make the contact between the poultry container side panel less vulnerable to the presence of contamination between the poultry container side panel and the periphery of the aperture in the poultry container. For limited production costs of the poultry container side panel the at least one foot may be an integrated part of the substantially rectangular screen.

The positioning element located at the peripheral sides of the substantially rectangular screen opposite to the peripheral side where the coupling is located may be provided by the contour of an aperture in the peripheral side of the poultry container side panel. Such position element construction is simple to provide and enables also easy use during the positioning of the poultry container side element in the aperture of the poultry container before the coupling is activated.

Preferably such positioning element aperture contour is wider that a protruding positioning element from the periphery of the aperture in the poultry container that it has to receive as this enables simple handling of the panel during positioning and removal. To provide a more solid and stable coupling the poultry container side panel may also comprises plural couplings. In case of two couplings a stabile coupling is to be combined with easy handling (as two couplings may be operated with two hands of a single operator). The at least one coupling may be integrated with the substantially rectangular screen to minimize costs by minimizing the number of components to be used. Simple construction, for instance by (injection) moulding is possible when the poultry container side panel is made out of a synthetic material. Not only may such material be wearable, it is also easy to process, not expensive and light (limiting the weight of the poultry container with one or more of the poultry container side panels according to the present invention).

For further strength of the screen construction screen at least one reinforcement rib may be provided, for instance a reinforcement rib connecting opposite peripheral sides of the substantially rectangular screen.

The present invention also provides a poultry container for holding live poultry, comprising: a bottom wall and four side walls protruding from the bottom wall; wherein at least one of the side walls is provided with a substantially rectangular aperture for receiving a poultry container side panel according to the present invention, wherein the periphery of the aperture in a side wall is provided with at least one counter-positioning element; and wherein the periphery of the aperture in a side wall opposite to the positioning counter-element holding peripheral side of the aperture is provided with at least one protruding coupling element. To cooperate with the poultry container side panel according the present invention the poultry container is provided with at least one matching counter-positioning element and at least one matching protruding coupling element, and also the dimensions of the aperture in the poultry container side and the poultry container side panel have to match. Normally the poultry container may comprise a metal frame as the loads onto the poultry container can be substantial. Dependent on the type of poultry container side panel used, the poultry container may also comprise plural protruding coupling elements in one aperture, for instance embodied as pens. The poultry container according to the invention may also be provided with plural apertures for receiving plural poultry container side panels, which panels may be of identical dimensions but it is also possible to have apertures (and poultry container side panels) with variable dimensions.

The poultry container may be provided with a door, which door is formed by a section of one of the side walls and a, with the side wall section connected, section of the bottom wall, which door is moveable connected with the rest of the poultry container such that the door is displaceable between a position wherein the door fits the rest of the poultry container and a position wherein the door leaves an opening in the side wall and the bottom for the passage of poultry. The door may be centrally located in the side wall and the side wall section of this door may be provided with one or more apertures for receiving a poultry container side panel according to the present invention.

On a peripheral side of the substantially rectangular aperture opposite to the coupling element protruding peripheral side of the aperture at least one protruding counter-positioning element may be provided to support a stable and solid, yet simple, positioning of a poultry container side panel having a contour of an opening in a peripheral side as a positioning element. Likewise also plural of such counter-positioning elements may be provided in the situation when plural openings in a peripheral side of a poultry container side panel are provided as a positioning elements. As already mentioned before in relation to the poultry container side panel according to the present invention the periphery of the opening in the periphery of a poultry container side panel may be wider that a protruding counter-positioning element connected to the periphery of the aperture in the poultry container as this enables simple handling of the panel during positioning and removal. The positioning element/counter-positioning element construction may also be reversed, thus embodying the periphery of the poultry container side panel with one or more protruding poisoning elements that cooperate with the periphery of one or more apertures provided in the periphery of the aperture in the poultry container.

Finally the present invention also provided an assembly of a poultry container for holding live poultry according to the present invention provided with one or more poultry container side panels according to the present invention.

BRIEF DESCRIPTION OF THE DRAWINGS

The invention will be further elucidated herein below on the basis of the non-limitative exemplary embodiments shown in the following figures. Herein.

DETAILED DESCRIPTION OF VARIOUS EMBODIMENTS

Figure 1:
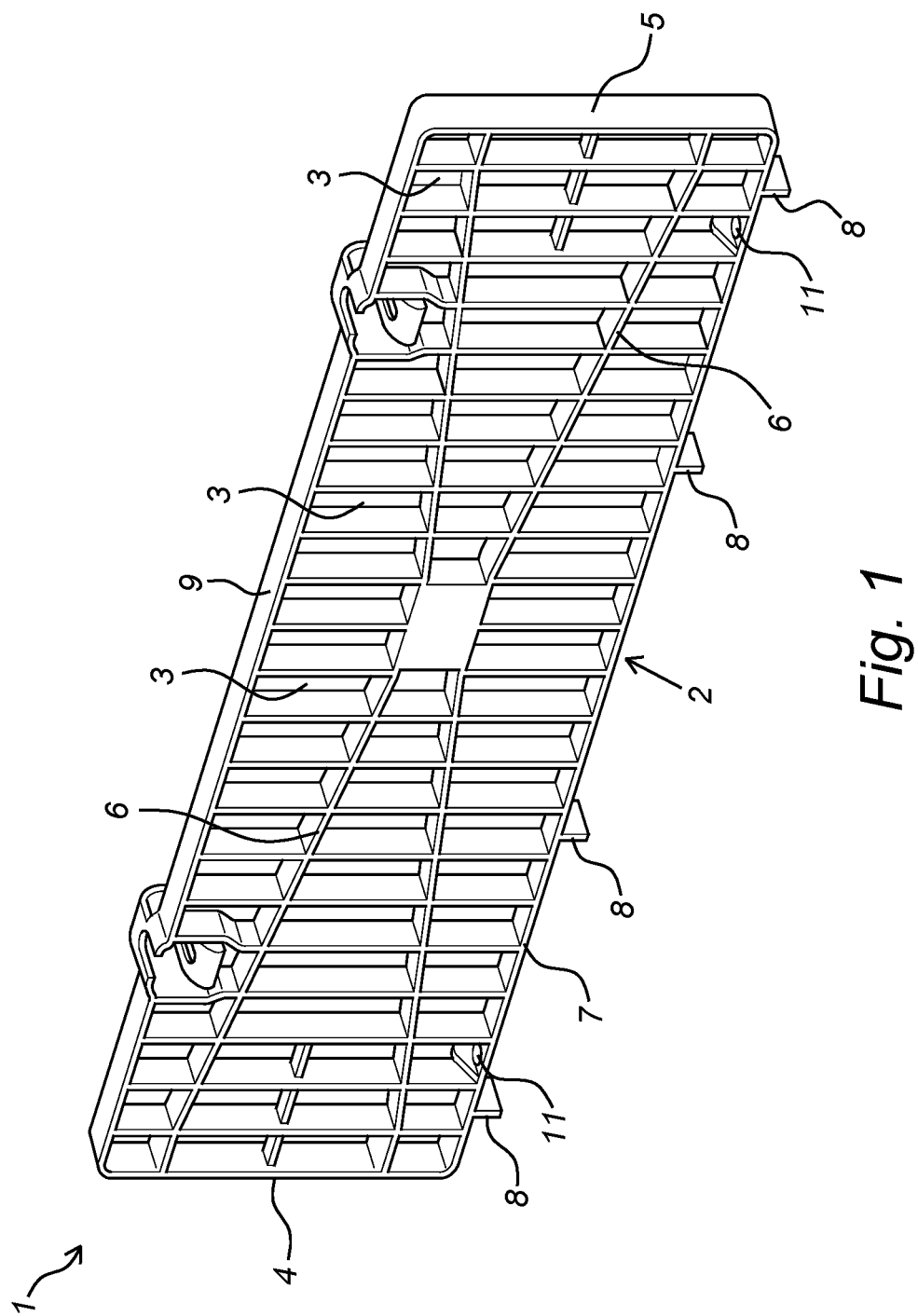
FIG. 1 shows a perspective schematic view on a poultry container side panel according to the present invention.

FIG. 1 shows a poultry container side panel 1 having a substantially rectangular screen 2 with apertures 3 for aeration of the poultry to be held in a poultry container. A left peripheral side 4 and a right peripheral side 5 of the side panel 1 are connected via reinforcement ribs 6 to provide additional constructive strength to the poultry container side panel 1. On the lower peripheral side 7 of the poultry container side panel 1 four feet 8 protrude which will rest on a part of the periphery of an aperture in a poultry container frame as will be illustrated later. On the upper peripheral side 9 of the side panel 1—thus opposite to the lower peripheral side 7 with the protruding feet 8—two couplings 10 are located. This coupling 10 will be illustrate in more detail in FIGS. 2A-2C. The side panel 1 is also provided with two positioning openings 11 at the support carrying lower peripheral side 7 of the substantially rectangular screen 2 for positioning the poultry container side panel 1 before coupling and for providing a solid connection with a poultry container after coupling of the side panel 1 to such poultry container.

Figure 2A:
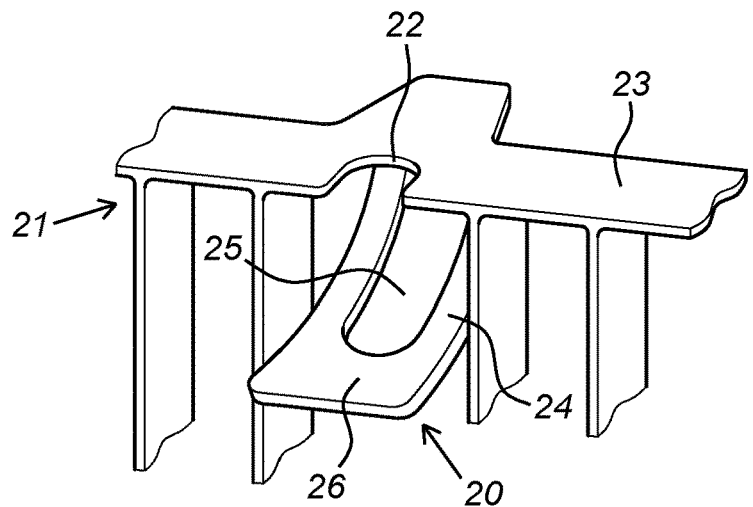
FIGS. 2A-2C perspective schematic views on a coupling as part of a poultry container side panel according to the present invention in various positions.

In FIG. 2A a coupling 20 is illustrated in a situation wherein it is not coupled. The coupling 20 is part of a poultry container side panel 21 an has a stationary support 22 connected to a peripheral side 23 of the poultry container side panel 21. A displaceable locking element 24 has a central opening 25 for housing a protruding coupling element (not shown in FIG. 2A). The displaceable locking element 24 has a control flap 26 that projects from the poultry container side panel 21 to make it accessible for an operator.

Figure 2B:
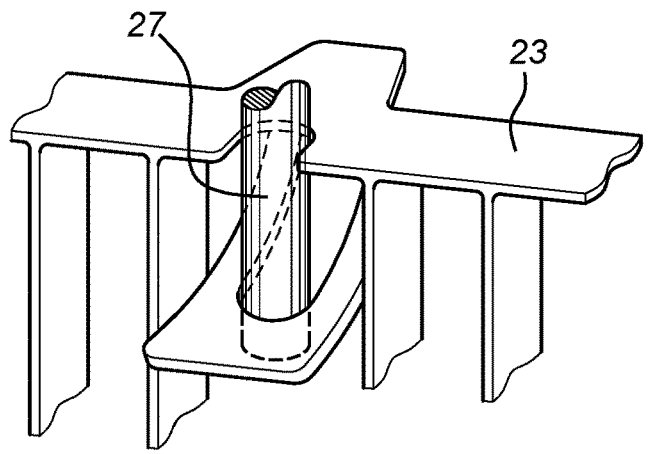
Figure 2C:
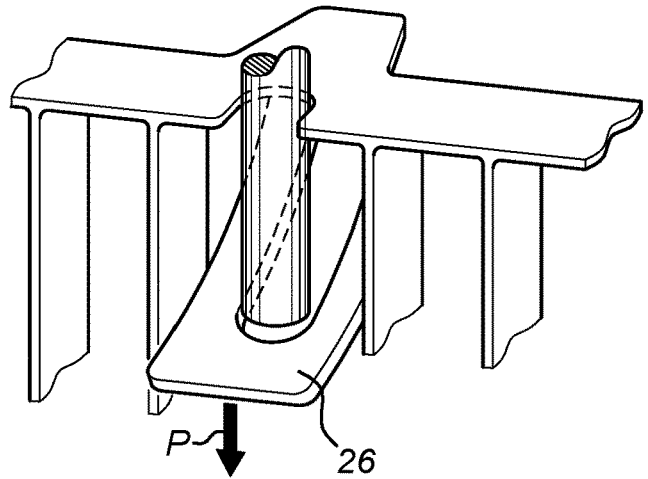

In FIG. 2B the coupling 20 from FIG. 2A is shown, again in a rest position but now holding a protruding coupling element 27. To bring the protruding coupling element 27 in the coupled position as illustrated in FIG. 2B, the displaceable coupling element 24 has to be displaced as is illustrated in FIG. 2C. The coupling element 24 is partially moved by exerting a force (see arrow P) onto the control flap 26. The displacement of the coupling element 24 also lowers the central opening 25 and thus provides access to the protruding coupling element 27 (pen) that is connected to the periphery of an aperture in a poultry container. After the force P is removed the resilient coupling element 24 moves back from the release position (FIG. 2C) to the coupling position (FIG. 2B). The direction of the force P is more or less parallel to the poultry container side panel 21.

Figure 3A:
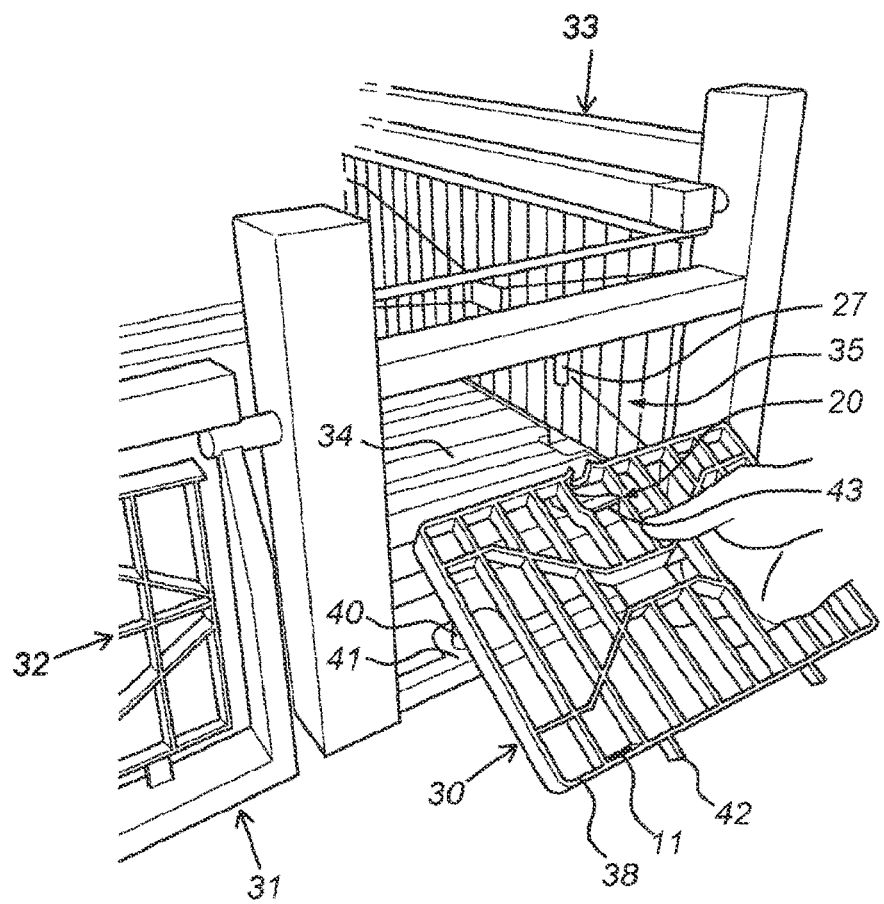
FIG. 3A shows a perspective view on a part of a poultry container and a poultry container side panel to be placed into an aperture in poultry container.

In FIG. 3A a poultry container side panel 30 is shown before placing it into a poultry container 31 of which only two side walls 32, 33 and a bottom wall 34 are shown. In one of the side walls 32 a rectangular aperture 35 is provided for receiving the poultry container side panel 30. On the top of the periphery of the rectangular aperture 35 a coupling element (pen) 27 is visible suited for cooperation with a coupling 20 as part of the poultry container side panel 30. For placing the side panel 30 in the rectangular aperture 35 the top of the side panel 30 is brought into the poultry container 31 through the aperture 35. In the lower peripheral side 38 of the poultry container side panel 30 positioning openings 11 are provided, the contour of which is placed over positioning pens 40 (counter-positioning elements) which protrude from the lower periphery side 41 of the rectangular aperture 35 in the poultry container 31. Subsequently feet 42 of the lower peripheral side 38 of the poultry container side panel 30 are placed onto the lower periphery side 41 of the rectangular aperture 35 in the poultry container 31. The upper side of the poultry container side panel 30 is then moved outward (thus by swinging it outward). By doing so the coupling 20 of the side panel 30 will contact the coupling element 27 of the poultry container 31 and for finalizing the attachment of the side panel 30 in the poultry container 31 a control flap 43 has to be moved to give the coupling element 27 of the poultry container 31 access into the coupling 20 of the side panel 30 (see for the coupling more details in FIGS. 2A-2C). An advantage for the inward (that is to say in the poultry container 31) positioning of the poultry container side panel 30 before coupling and decoupling is that thus the uncontrolled leave of live poultry may be prevented during replacement of the poultry container side panel 30.

Figure 3B:
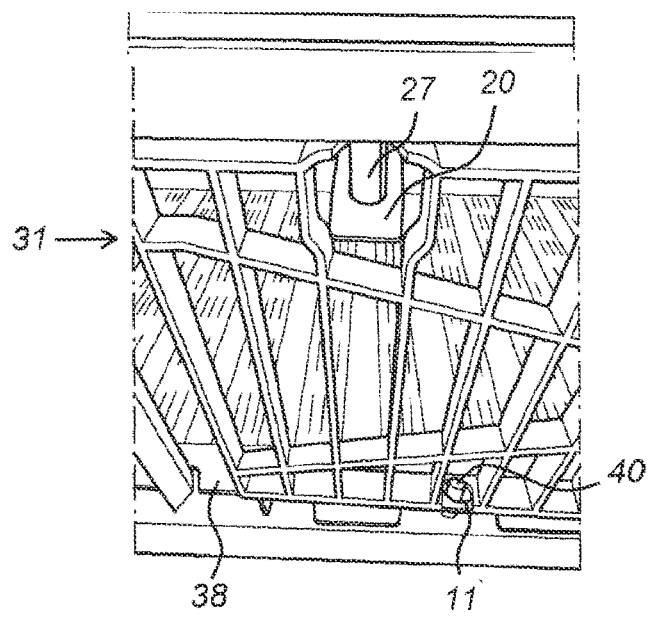
FIG. 3B shows a perspective view on the part of the poultry container and the poultry container side panel as shown in FIG. 3A after coupling.

In FIG. 3B the poultry container side panel 30 is shown after placing it into the poultry container 31. The coupling 20 of the side panel 30 holds the coupling element 27 of the poultry container 31 and on the lower peripheral side 38 of the poultry container side panel 30 is visible that the positioning pen 40 protrude from the lower periphery side 41 of the poultry container aperture 35 into the positioning opening 11 in the lower peripheral side 38 of the poultry container side panel 30. Also visible is that the contour of the positioning opening 11 is wider than the diameter of the positioning pen 40 providing a loose fitting.

Figure 4:
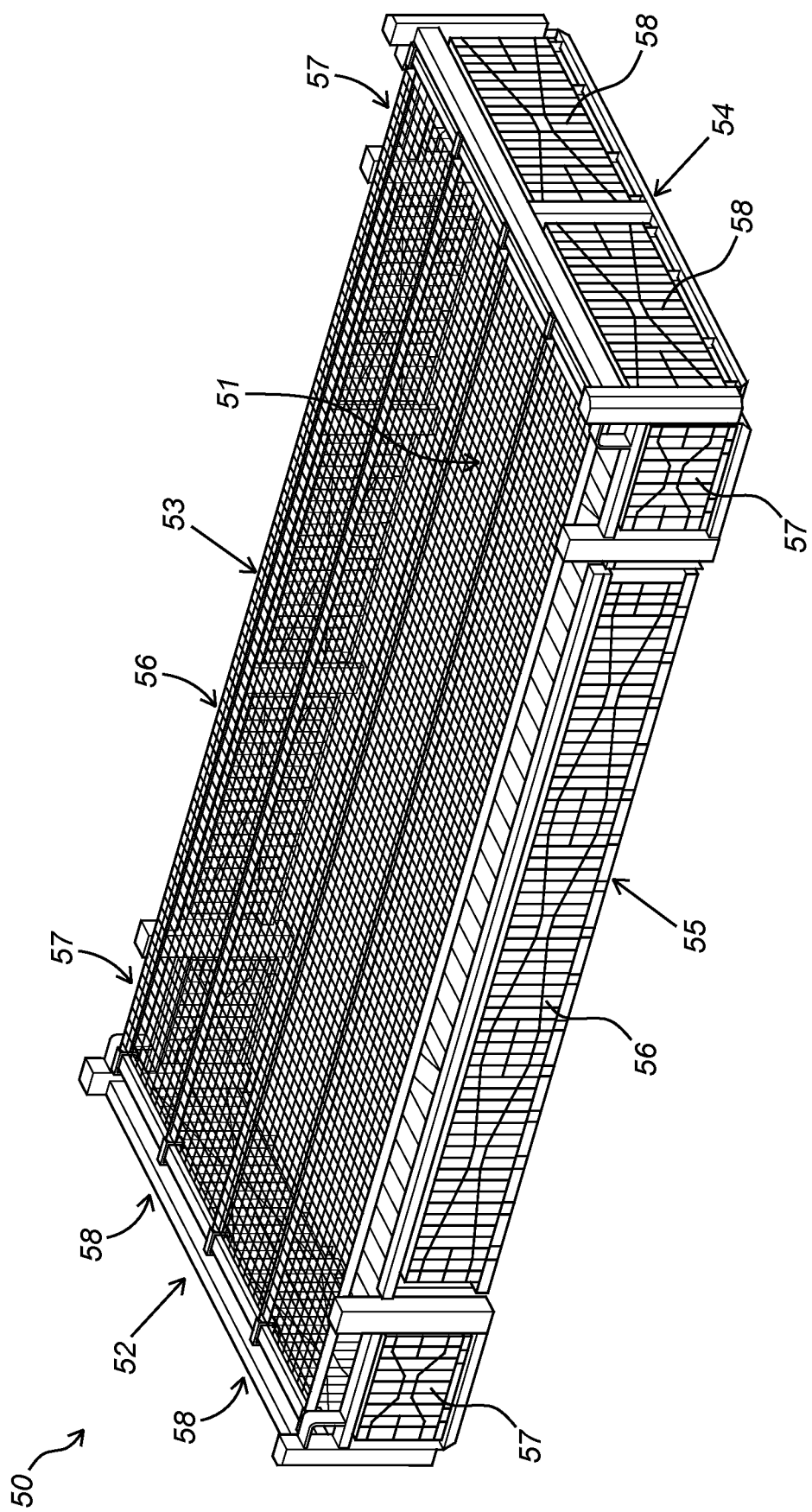
FIG. 4 a poultry container for holding live poultry with plural poultry container side panels according to the present invention.

FIG. 4 shows a poultry container 50 for holding live poultry, with a bottom wall 51 and four side walls 52-55 protruding from the bottom wall 51. A door 56 is formed by a section of one of the side walls 55 and a section of the bottom wall 51. The door 56 is displaceable between a position wherein the door 56 fits the rest of the poultry container 50, which is the situation shown in FIG. 4, and a position wherein the door 56 leaves an opening in the side wall 55 and the bottom wall 51 for the passage of poultry (this situation is not shown here). In the side walls 52-55 of the poultry container 50 are poultry container side panels 57, 58 attached of various sizes.

The invention claimed is:

1. A poultry container side panel for releasable connection to a poultry container for holding live poultry, comprising:
    a synthetic substantially rectangular screen comprising front and back sides provided with apertures, the substantially rectangular screen further comprising first, second, third, and fourth peripheral sides that encompass the front and back sides, wherein the first, second, third, and fourth peripheral sides each have an inner surface adjacent to the apertures and an outer surface opposite the inner surface;
    at least one positioning element located between the front and back sides and extending through the inner surface and the outer surface of the first peripheral side of the substantially rectangular screen; and
    at least one coupling located on the third peripheral side of the substantially rectangular screen, the third peripheral side being opposite to the first peripheral side of the substantially rectangular screen;
    wherein the at least one coupling comprises a stationary support connected to the rectangular screen, the stationary support being located on the third peripheral side and adjacent the front side of the substantially rectangular screen and extending through the inner surface and the outer surface of the third peripheral side;
    wherein the at least one coupling comprises a displaceable locking element moveable between a coupling position and a release position, the displaceable locking element being located on the third peripheral side adjacent the stationary support and extending beyond the back side and the inner surface of the third peripheral side and toward both the front side and the first peripheral side through the substantially rectangular screen,
    wherein the displaceable locking element is a synthetic and integrated part of the synthetic rectangular screen.

2. The poultry container side panel according to claim 1, wherein the poultry container side panel is a single moulded part.

3. The poultry container side panel according to claim 1, wherein the displaceable locking element is resiliently connected to the rectangular screen using the flexibility of a connecting synthetic material.

4. The poultry container side panel according to claim 1, wherein the displaceable locking element has a central opening and a control flap that projects from the substantially rectangular screen.

5. The poultry container side panel according to claim 1, wherein the poultry container side panel comprises at least one sideward protruding foot extending from the outer surface of the third peripheral side of the substantially rectangular screen.

6. The poultry container side panel according to claim 5, wherein the at least one sideward protruding foot is integrated with the substantially rectangular screen.

7. The poultry container side panel according to claim 1, wherein the positioning element provides a contour of a positioning opening in the first peripheral side of the substantially rectangular screen.

8. The poultry container side panel according to claim 1, wherein the at least one coupling comprises a plurality of couplings integral with the poultry container side panel.

9. The poultry container side panel according to claim 1, wherein the at least one coupling is integrated with the substantially rectangular screen.

10. The poultry container side panel according to claim 1, wherein the substantially rectangular screen comprises at least one reinforcement rib.

11. The poultry container side panel according to claim 10, wherein the reinforcement rib connects opposite second and fourth peripheral sides of the substantially rectangular screen.

12. A poultry container for holding live poultry, comprising:
    a bottom wall and four side walls protruding from the bottom wall;
    wherein at least one of the side walls is provided with a substantially rectangular aperture for receiving a poultry container side panel for releasable connection to the poultry container for holding live poultry, the poultry container side panel comprising a synthetic substantially rectangular screen, the substantially rectangular screen comprising front and back sides provided with apertures and further comprising first, second, third, and fourth peripheral sides that encompass the front and back sides, wherein the first, second, third, and fourth peripheral sides each have an inner surface adjacent to the apertures and an outer surface opposite the inner surface;
    at least one positioning element located between the front and back sides and extending through the inner surface and the outer surface of the first peripheral side of the substantially rectangular screen; and
    at least one coupling located on the third peripheral side of the substantially rectangular screen, the third peripheral side being opposite to the first peripheral side of the substantially rectangular screen;
    wherein the at least one coupling comprises a stationary support connected to the rectangular screen, the stationary support being located on the third peripheral side and adjacent the front side of the substantially rectangular screen and extending through the inner surface and the outer surface of the third peripheral side;
    wherein the at least one coupling comprises a displaceable locking element moveable between a coupling position and a release position, the displaceable locking element being located on the third peripheral side adjacent the stationary support and extending beyond the back side and the inner surface of the third peripheral side and toward both the front side and the first peripheral side through the substantially rectangular screen,
    wherein the displaceable locking element is a synthetic and integrated part of the synthetic rectangular screen,
    wherein the periphery of the substantially rectangular aperture in the at least one side wall is provided with at least one counter-positioning element configured to engage the at least one positioning element on the first peripheral side of the substantially rectangular screen; and wherein the periphery of the substantially rectangular aperture in the at least one side wall opposite to the counter-positioning element holding peripheral side of the aperture is provided with at least one protruding coupling element configured to engage the at least one coupling on the third peripheral side of the substantially rectangular screen.

13. The poultry container according to claim 12, wherein the poultry container comprises a metal frame.

14. An assembly of a poultry container for holding live poultry comprising:
- the poultry container for holding live poultry, including:
  - a bottom wall and four side walls protruding from the bottom wall;
  - wherein at least one of the side walls is provided with a substantially rectangular aperture for receiving at least one poultry container side panel for releasable connection to the poultry container for holding live poultry, the at least one poultry container side panel comprising a synthetic substantially rectangular screen, the substantially rectangular screen comprising front and back sides provided with apertures and further comprising first, second, third, and fourth peripheral sides that encompass the front and back sides, wherein the first, second, third, and fourth peripheral sides each have an inner surface adjacent to the apertures and an outer surface opposite the inner surface;
  - at least one positioning element located between the front and back sides and through the inner and outer surfaces of the first peripheral side of the substantially rectangular screen; and
  - at least one coupling located on the third peripheral side of the substantially rectangular screen, the third peripheral side being opposite to the first peripheral side of the substantially rectangular screen;

wherein the at least one coupling comprises a stationary support connected to the rectangular screen, the stationary support being located on the third peripheral side and adjacent the front side of the substantially rectangular screen and extending through the inner surface and the outer surface of the third peripheral side;

wherein the at least one coupling comprises a displaceable locking element moveable between a coupling position and a release position, the displaceable locking element being located on the third peripheral side adjacent the stationary support and extending beyond the back side and the inner surface of the third peripheral side and toward both the front side and the first peripheral side through the substantially rectangular screen, wherein the displaceable locking element is a synthetic and integrated part of the synthetic rectangular screen, wherein the periphery of the substantially rectangular aperture in the at least one side wall is provided with at least one counter-positioning element, the at least one counter-positioning element extending from the periphery toward an opposing end of the periphery; and wherein the opposing end of the periphery of the substantially rectangular aperture in the at least one side wall is provided with at least one protruding coupling element, the protruding coupling element extending from the opposing end of the periphery toward the periphery of the substantially rectangular aperture provided with at least one counter-positioning element.

\* \* \* \* \*